United States Patent [19]
Gildea

[11] Patent Number: 5,523,761
[45] Date of Patent: *Jun. 4, 1996

[54] DIFFERENTIAL GPS SMART ANTENNA DEVICE

[75] Inventor: David R. Gildea, Menlo Park, Calif.

[73] Assignee: Trimble Navigation Limited, Sunnyvale, Calif.

[*] Notice: The term of this patent shall not extend beyond the expiration date of Pat. No. 5,345,244.

[21] Appl. No.: 157,609

[22] Filed: Nov. 23, 1993

Related U.S. Application Data

[63] Continuation-in-part of Ser. No. 31,135, Jan. 12, 1993, Pat. No. 5,345,244.
[51] Int. Cl.$^6$ ........................................ G01S 5/02
[52] U.S. Cl. ........................................ 342/357
[58] Field of Search ........................................ 542/357

[56] References Cited

U.S. PATENT DOCUMENTS

| | | | |
|---|---|---|---|
| 4,751,512 | 6/1988 | Longaker | 342/357 |
| 4,894,655 | 1/1990 | Joguet et al. | 342/357 |
| 5,345,244 | 9/1994 | Gildea et al. | 342/357 |

*Primary Examiner*—Gregory C. Issing
*Attorney, Agent, or Firm*—John Schipper

[57] ABSTRACT

Integrated antenna apparatus for determination of the location of an observer and/or of the time of observation by use of a GPS or a GLONASS or other Satellite Positioning System that uses differential corrections of the pseudorange, the location and/or the observation time. The apparatus includes an antenna module and a display module, connected by a communication link. In one embodiment, the antenna module includes: a GPS antenna to receive the GPS signals; a signal frequency downconverter; a Differential GPS (DGPS) radiowave signal antenna and receiver to receive GPS correction information; a GPS/DGPS signal processor to receive the GPS antenna and DGPS antenna output signals and to determine at least one of (i) the present GPS antenna location, as corrected by the DGPS signals, and (ii) the observation time of such location; and a communication link to communicate GPS processor output signals to the display unit. The display module in this embodiment includes: a display processor to receive signals from the communication link and to process these signals for display of location or time information; and display means to visibly or audibly display the location or time information. In other embodiments, these components are repositioned. The communication link may be one or more cables or wires or may be a wireless link.

61 Claims, 6 Drawing Sheets

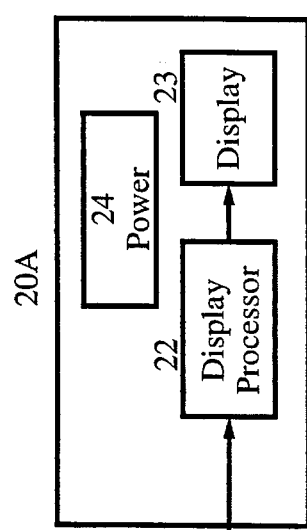
FIG. 1A
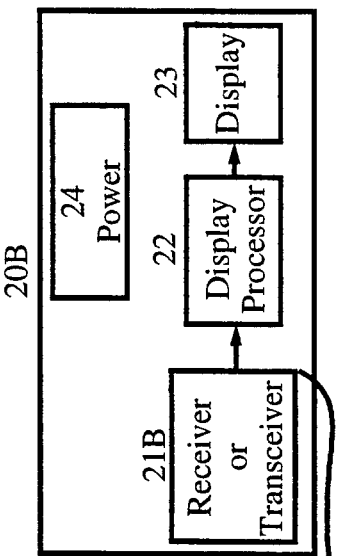
FIG. 1B
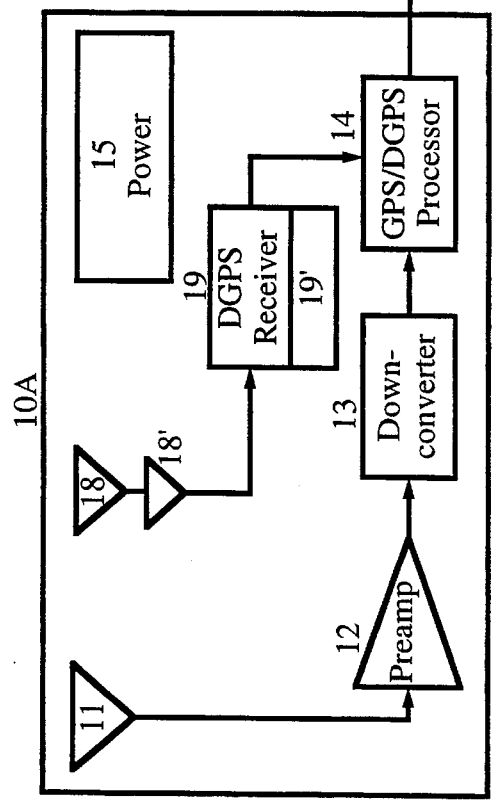
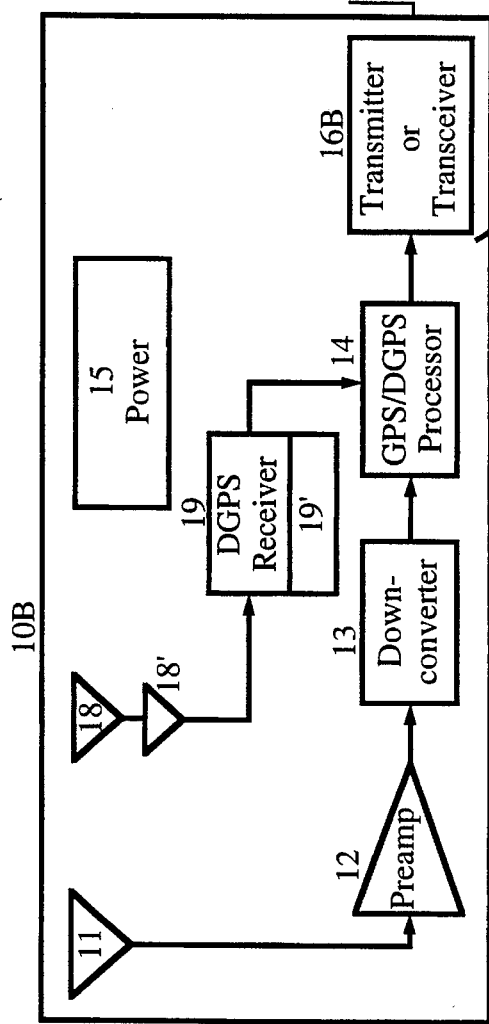

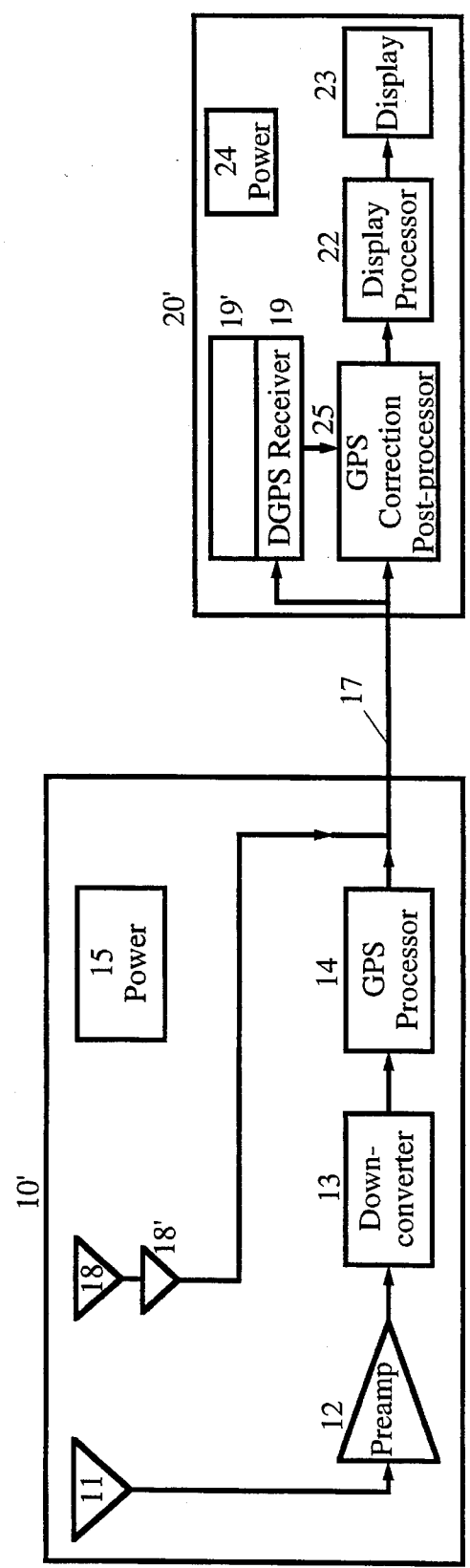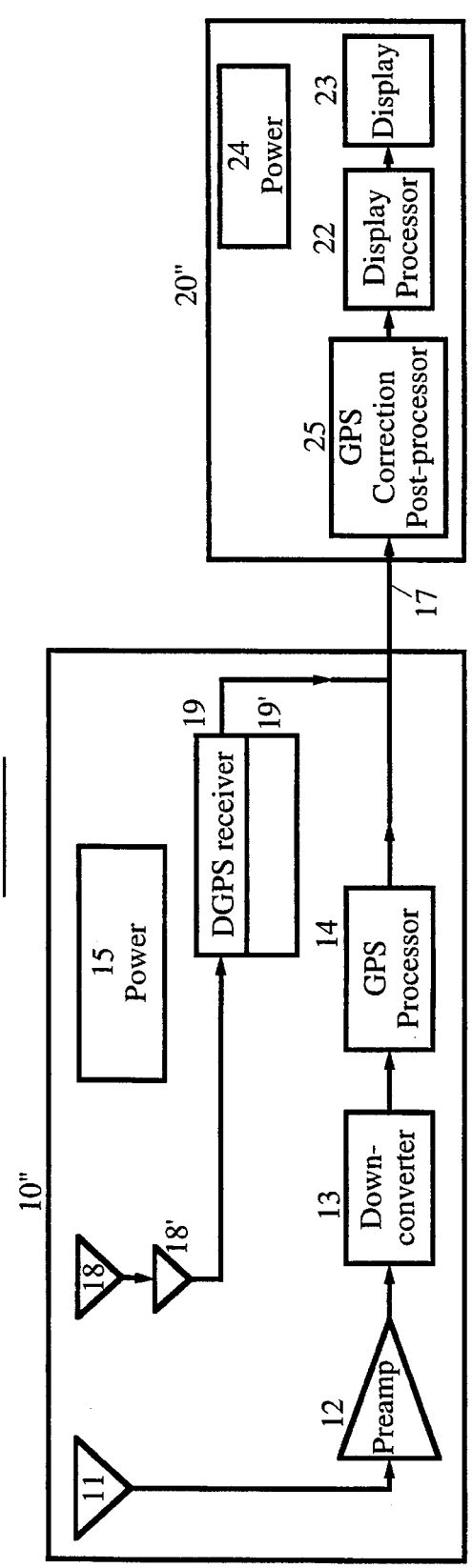

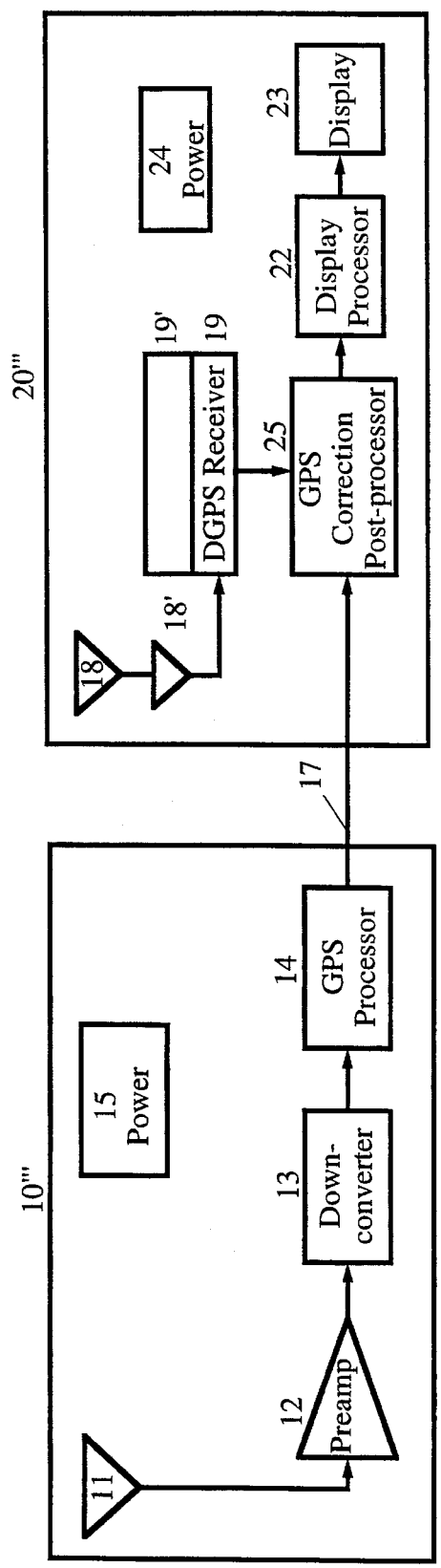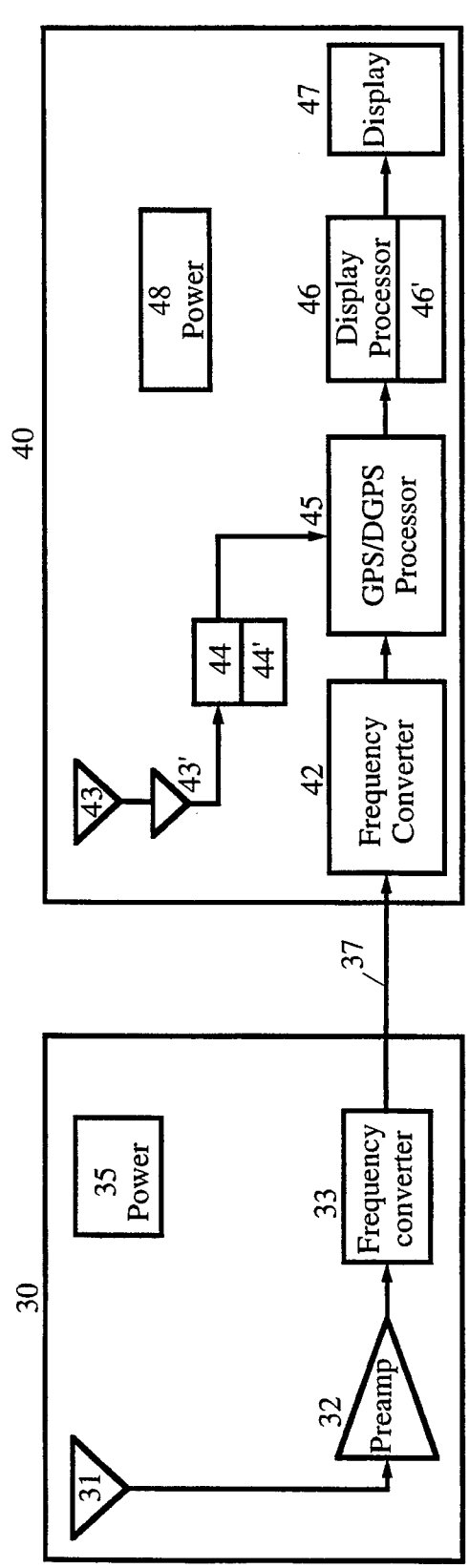
FIG. 4
FIG. 5

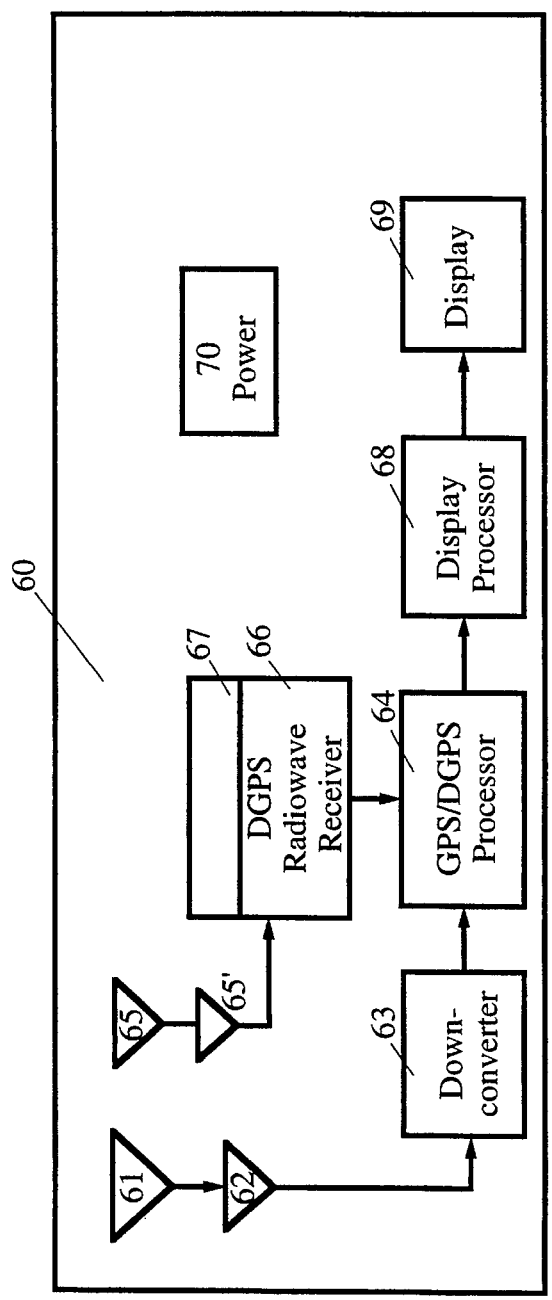
FIG. 6
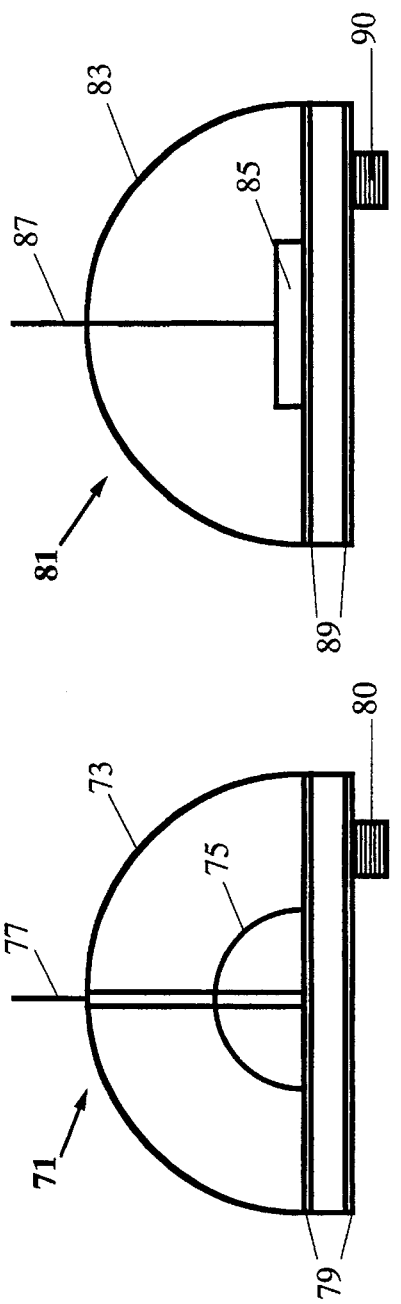
FIG. 7
FIG. 8

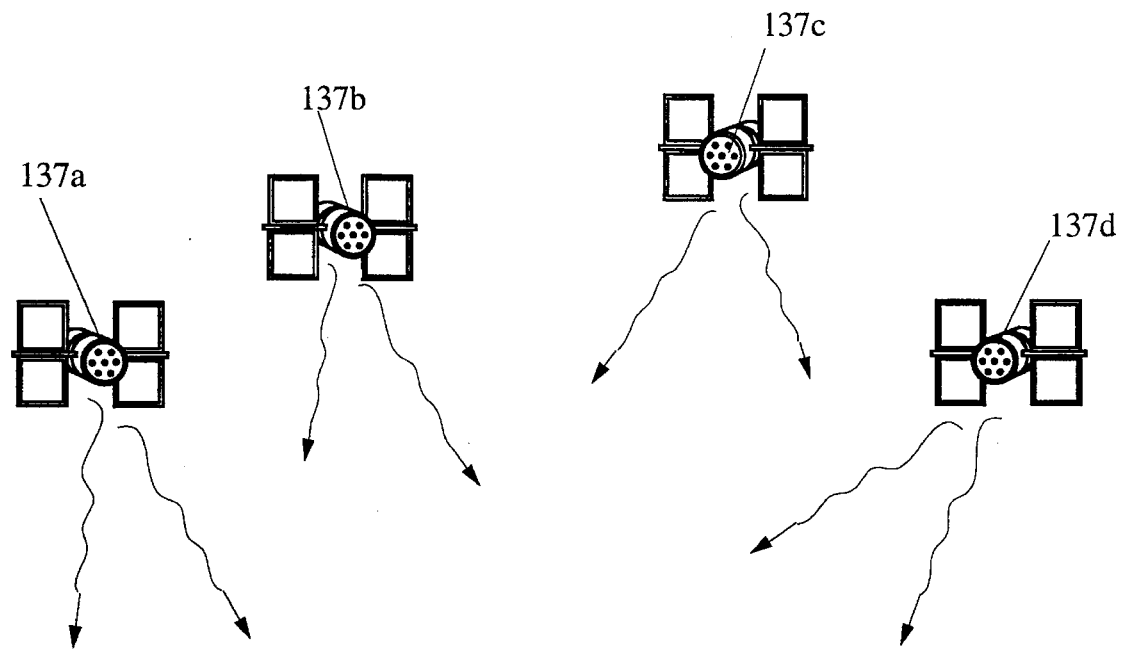
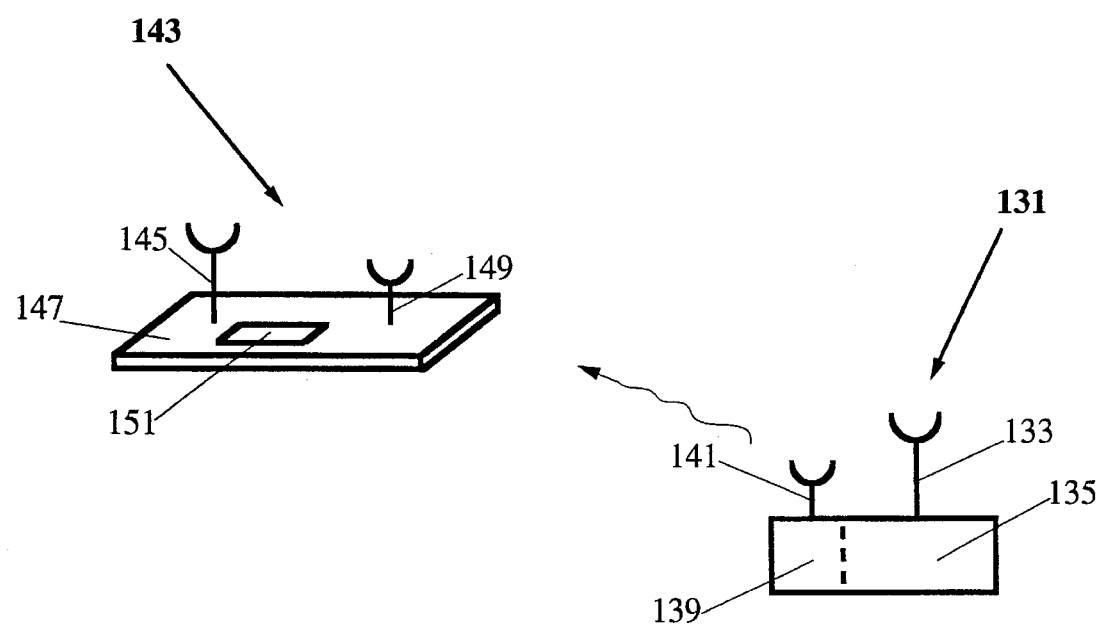
FIG. 13 ns frequencies, and transmits the GPS signals to the aircraft, where the location of the buoy is determined with a certain inaccuracy. The buoy is quite large as it must float on the water's surface, and no GPS processing is performed on or adjacent to the buoy.

U.S. Pat. No. 4,641,366, issued to Yokoyama et al, discloses use of portable radio (handset) apparatus, including first and second antennas recessed into one side of the portable radio and capable of receiving signals in two separate frequency bands to which the radio responds. The radio apparatus includes one or two frequency converters to convert between audio and rf frequencies.

A small, handheld antenna is disclosed in U.S. Pat. No. 4,701,763, issued to Yamamoto et al. FIG. 14 of this patent illustrates application of this antenna concept to an rf signal receiver or transmitter. The high gain antenna is small enough to be insertable into many types of signal-receiving electronics devices, such as pagers. Most of this disclosure is concerned with the three-layer structure of the antenna.

Fowler, in U.S. Pat. No. 4,754,283, discloses a cordless GPS sounding device using two antennas, a first antenna to receive radiowaves from an antenna carried by a balloon aloft that indicates wind direction and velocity, and a second antenna to receive conventional GPS signals from a GPS satellite. The ground-based GPS signal receiver and antenna are connected by cables or wires to the balloon-sensing antenna and to a computer for determining wind direction and velocity as the balloon drifts relative to the ground-based receiver.

Blaese discloses a portable antenna suitable for mounting on a motor vehicle's side window, in U.S. Pat. No. 4,804,969. The mounting means facilitates easy installation and removal. The antenna apparatus includes a pivotable or fold-out, current feed line radiator, which is mounted on the outside surface of the window and is electrically attached to other portions of the antenna electronics located on the inside surface of the window. A coaxial cable connects the inside surface electronics to a separate transceiver located inside the vehicle. The line radiator includes a ⅝ wavelength radiator, stacked on a helical separation coil, stacked on a ⅜ wavelength radiator, for field cancellation purposes. Blaese discloses a cordless, easy-mount antenna of similar design that obviates the need for the coaxial cable, in U.S. Pat. No. 5,059,971; a second line radiator provides a wireless link with the transceiver.

A very thin radio housing having a printed circuit loop antenna mounted in a plane on an interior wall of the housing is disclosed by Urbish et al in U.S. Pat. No. 4,894,663. The housing opens as a notebook would open, to disclose the antenna and a portion of the antenna electronics, and a portion of the antenna circuit is located on a hinge that facilitates opening and closing the housing. The antenna, electronics and housing are intended to serve as a credit card size page signal receiver or other signal receiving system.

Newland discloses a small antenna for a cordless telephone in U.S. Pat. No. 4,897,863. The tip-and-ring wiring in the associated telephone handset serves as the antenna, which provides telecommunication capability with the rest of the world through a wireless link to inside telephone wiring in an adjacent structure, such as a home. The tip-and-ring wiring thus serves as both a signal feed line and as an antenna. Audio and radio frequency signals can be transmitted and received using this antenna.

Mori et al, in U.S. Pat. No. 4,935,745, disclose a credit card size radio receiver with a slot antenna integrated as part of the receiver housing. Three contiguous sides of the card

DIFFERENTIAL GPS SMART ANTENNA DEVICE

FIELD OF THE INVENTION

This is a continuation-in-part of the patent application Ser. No. 08/031,135, filed 12 Jan. 1993, now U.S. Pat. No. 5,345,244, and assigned to the assignee of this application. This invention relates to antennas and receivers for satellite-based positioning systems, such as a Global Positioning System.

BACKGROUND OF THE INVENTION

Satellite Positioning System antennas and receivers, such as those for the Global Positioning System (GPS) and for the Global Orbiting Navigational System (GLONASS) discussed below, are now used for many applications requiring determination of the observer's location anywhere on or in the vicinity of the Earth.

A differential GPS (DGPS) receiver includes a GPS antenna to receive the GPS signals transmitted from one or more GPS satellites, a GPS processor to calculate the GPS antenna's position mid time of observation of that position from the GPS signals, a display processor to convert the GPS position and observation time into information that is useful for an application, and a display to present the information to the user, and a DGPS antenna and processor to receive and apply differential corrections to produce GPS signals with improved accuracy. The GPS antenna must be positioned with a direct line of sight to the GPS satellite or satellites from which the receiver receives GPS signals.

Current GPS receivers adopt one of two formats. The first format, commonly called "handheld," includes a GPS antenna, a GPS processor, a display processor, and a display in a single unit. A DGPS antenna and receiver are provided in a separate unit or units that is connected to the GPS processor. A problem with this format is that the user must remain in the open to preserve a direct line of sight from the GPS antenna to one or more GPS satellite while operating and observing the user's display.

The second format places the GPS antenna in an antenna unit and the display in a separate display unit. The GPS processor and the display processor may be contained in the antenna unit, in the display unit, or in a separate unit or units. This format allows the user to separate the GPS antenna and the display so that the GPS position and time information can be observed and operated upon in a protected environment. A DGPS antenna and receiver are provided in a separate unit or units connected to the GPS processor in this format also.

In either format, a cable is used to connect the GPS processor to the DGPS antenna and receiver, to the GPS antenna unit, to the display unit, and/or to any unit(s) that depend upon the GPS processor. This requires that the DGPS antenna and receiver and any cable(s) connecting these units to the GPS receiver be moved together with the GPS receiver as an observer moves around within a region. These connections are often bulky, expensive and prone to breakage or malfunction.

Workers in other technical areas have developed some related technology. Westerfield, in U.S. Pat. No. 4,622,557, discloses a transdigitizer for relaying signals received by a buoy from GPS satellites to an aircraft containing a GPS processing station that is spaced apart from the buoy. The buoy receives GPS satellite signals, downconverts the sigsize housing together serve as the antenna. An rf frequency circuit (not shown) receives and processes the incoming radio signals and is carried by the housing. The apparatus is intended to serve as a card size page signal receiver.

U.S. Pat. No. 5,052,645, issued to Hixon, discloses a telescoping pole antenna that can be used to support a GPS signal antenna. The pole includes many concentric telescoping, vertically oriented cylinders that can be collapsed to one meter in height or extended to a height of as much as 20 meters. The antenna and telescoping support pole combination is not portable and would probably have a mass of several tens of kilograms.

A credit card size radio page signal receiver, with a portion of the receiver housing serving as an antenna, is disclosed in U.S. Pat. No. 5,054,120, issued to Ushiyama et al. Top and bottom walls of the housing serve as part of a loop antenna that can handle VHF signals. The antenna is not defined by any particular circuit integrated with the housing.

Raubenheimer et al disclose a handheld navigational aid, including a keyboard for data entry, a visual display and a loudspeaker for audible communication, in U.S. Pat. No. 5,059,970. The visual display presents a small map of a chosen region, and the map provides two cursors to indicate and determine the distance between two points on the map. An icon indicates the position of a chosen marine or airborne vessel on the map, and present position relative to a fixed reference point is visually displayed as distance/bearing or as latitude/longitude coordinates in a two-dimensional representation. The apparatus contains a microprocessor and stored-on-board algorithms and mathematical equations for signal processing purposes and relies upon a resettable internal clock for certain display purposes. Input signals appear to be entered through the keyboard.

A coupler that avoids use of a hardware connection between a stationary remote GPS signal antenna and a handheld GPS receiver with a display window is disclosed by Mason et al in U.S. Pat. No. 5,239,669. The coupler is connected to, and receives GPS signals from, the remote antenna by an interconnect cable. The coupler includes a driver circuit and an antenna that receives and transmits the GPS signals to the handheld GPS receiver, which must be within six feet of the coupler.

What is needed is Differential Global Positioning System (DGPS) apparatus, contained in a single antenna;like package, that: allows the user to place a GPS antenna in a direct line of Sight from one or more GPS satellites; allows the user to operate and observe the position and/or observation time display in-a protected environment; and allows receipt and processing of differential GPS radiowave signals to determine the corrected location and/or observation time for the device using GPS methods. Preferably, the system should allow the user and display unit to move around without the inconvenience and poor reliability associated with use of a cable or cord.

SUMMARY OF THE INVENTION

These needs are met by the invention, which provides an apparatus including: a GPS antenna, positioned to receive GPS signals from one or more GPS satellites, with each signal being characteristic of a particular satellite source; a differential GPS ("DGPS") radiowave signal antenna, positioned to receive differential radiowave carrier and/or subcarrier signals from a radiowave source of DGPS corrections; a downconverter to downconvert the primary frequency of the GPS signals to a selected lower frequency; a GPS (or GPS/DGPS) signal receiver/processor to determine the present position and observation time for the GPS antenna; a display processor to operate application software; a visual display; a cable or wireless communication link to electrically connect the unit containing the GPS antenna to the display unit; and a DGPS radiowave receiver to receive the DGPS radiowave signals received by the DGPS radiowave antenna for GPS correction processing or postprocessing. The system itself includes this apparatus plus a stationary GPS reference station, whose location is known with high accuracy; to transmit the DGPS signals for receipt and use by the apparatus. The term "DGPS radiowave" signal, as used herein, includes electromagnetic signals containing GPS differential correction information transmitted by the Coast Guard DGPS network, by radiobeacon signals, by FM subcarrier signals, by digital subcarrier on an analog two-way radio, by digital radio signals, by cellular telephone signals, by digital cellular telephone signals, and by private and semiprivate network signals that use terrestrial and/or satellite apparatus for transmitting DGPS signals for correction of the GPS location and/or time information.

A first embodiment of a DGPS Smart Antenna device includes an antenna module containing a GPS antenna, a GPS/DGPS signal receiver/processor and its associated memory, a DGPS radiowave signal antenna, a DGPS signal receiver and its associated memory (optional), a power supply, and a communication link ("commlink") to facilitate one-way or two-way communications with a separate display module containing a display processor/memory, display and power supply.

In a second embodiment, the DGPS signal receiver is moved to the display module and a GPS correction post-processor is added to receive the DGPS signals and the GPS location information and to correct the GPS location, using information from the DGPS signals. In a third embodiment, a GPS correction post-processor is added to the display module and receives DGPS signals from the DGPS signal receiver on the antenna module. In a fourth embodiment, the DGPS signal antenna and DGPS signal receiver are moved to the display module and a GPS correction post-processor is added to receive the DGPS signals. In a fifth embodiment, the GPS/DGPS signal receiver/processor, the DGPS signal antenna and the DGPS signal receiver are moved to the display module. In a sixth embodiment, all components are contained on a single, handholdable module.

Each of these embodiments allows the antenna unit containing the GPS antenna to be placed with a direct line of sight to one or more GPS satellites, while the display unit can be carried by the user anywhere within a region determined by the ability of the display module to receive cable or wireless communications from the antenna module. The distance from the antenna module to the display module can range from zero meters (abutting) to a few hundred meters, depending upon other variables. The DGPS radiowave signal antenna and associated receiver and memory are arranged to receive carrier and subcarrier signals that provide DGPS information, user paging messages and the like continuously or intermittently as GPS signals are received and processed for location information.

The GPS signal antenna may be a turnstyle antenna, a patch antenna, a quadrifilar antenna, or any other antenna that is suitable for receipt of GPS signals. The DGPS radiowave signal antenna may be a whip antenna, a loop or magnetic antenna, a dipole antenna or any other antenna that is suitable for receipt of DGPS radiowave signals. The DGPS Smart Antenna device integrates two signal receiving and processing packages (DGPS radiowave signal antenna/ receiver and GPS/DGPS signal processor), all contained in a portable package that may be the size of one or two credit cards.

BRIEF DESCRIPTION OF THE DRAWINGS

FIGS. 1A, 1B and 2–6 are schematic views of signal processing components according to embodiments of the invention.

FIGS. 7–12 are schematic views illustrating different GPS signal antennas and DGPS radiowave signal antennas that may be used according to the invention.

FIG. 13 illustrates operation of a GPS/DGPS system according to the invention.

DETAILED DESCRIPTION OF THE INVENTION

Figure 10:
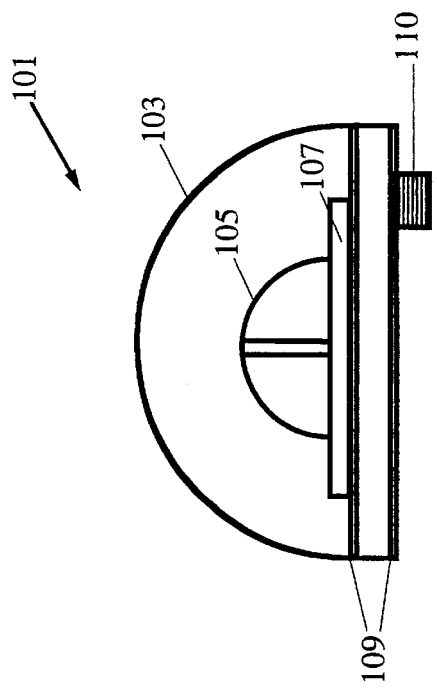

FIG. 1A illustrates a first embodiment of the invention, a DGPS Smart Antenna device, which may include an antenna module 10A of convenient size and shape such as 5–20 cm diameter, measured by projection of the device on a chosen plane ("horizontal diameter"), and 5–20 cm, measured in a direction approximately perpendicular to this plane ("height"). The antenna module 10A includes a GPS signal antenna 11, whose antenna output signals are amplified by a preamplifier 12 (optional). The antenna output signals are received by a frequency downconverter 13, whose output signals are received and processed by a GPS/DGPS signal receiver/processor 14 and associated memory. A commlink 17A, such as one or more interconnect cables, receives input signals from the GPS processor and transmits these signals to a display module 20A.

The cable commlink 17A may be replaced by a commlink 17B including a transmitter 16B on an antenna module 10B, a wireless link 17WL and a receiver 21B on a display module 20B, as shown in FIG. 1B. The transmitter 16B transmits input signals to, but does not receive signals from, the display module 20B, via the commlink 17B. In this instance, the receiver 21B receives input signals from, but does not transmit signals to, the antenna module 10B. The receiver issues signals to the display processor 22. Except for the commlink 17A or 17B, signal processing operations on the modules 10A and 10B, and on the modules 20A and 20B, are similar.

Alternatively, the transmitter 16B and the receiver 21B in FIG. 1B may be replaced by two transceivers to allow the signal processor 14 to receive signals from the display module 20B. Each transceiver 16B and 21B preferably includes all apparatus required to transmit and receive signals over a shortlink wireless system 17WL, including hardware for an antenna, transmitters, amplifiers, modulators, demodulators, parallel-to-serial converter, clock, recovery, carrier recovery, and software for data buffers, channel selection, user identification, user discrimination, error detection and/or correction, retransmission, and interfacing. The display module 20B (or 20A) may include a combination of a general purpose computer, programmed for applications of GPS, and the commlink 17B (or 17A). Alternatively, the display module 20B may be specifically designed for marine, aviation, terrestrial navigation, applications for navigation, tracking, map making, surveying, event marking, or any other field in which GPS location is applied.

The wireless link in FIG. 1B may operate at any suitable frequency, including microwave and radiowave with transmit and receive antennas, infrared or visible range with light and light detection devices, or audible or acoustic with speaker and microphone devices, and may use any type of modulation, including those in which the frequency, amplitude, or phase of the carrier signal is modulated.

A DGPS radiowave signal antenna 18 and an optional signal preamplifier 18', contained on the module 10A in FIG. 1A, receives and initially preamplifies DGPS signals (discussed below) and passes these DGPS signals to a radiowave receiver 19, which is connected to and may be part of the GPS/DGPS signal receiver/processor 14. The receiver 19 has an associated memory unit 19' (optional), distinguishes between the various message types received as part of the DGPS signals, and provides the pseudorange or location corrections (for example, message Types 1, 9 and other optional types if an RTCM format is used) to the original GPS signals received by the receiver/processor 14, for correction of the location of the GPS antenna 11. Optionally, the DGPS receiver 19 may be combined with the GPS/DGPS signal receiver/processor 14. The corrected GPS-determined location signals are then transmitted by a commlink 17A to a display module 20A, a second signal processing module of the DGPS Smart Antenna device. A power supply 15 provides operating power for the GPS antenna 11, the preamplifier 12, the downconverter 13, the GPS/DGPS signal receiver/processor 14, the commlink 17A, the DGPS radiowave signal antenna 18, the preamplifier 18', the radiowave receiver 19, and/or a memory unit 19', if needed.

The display module 20A includes receives and transmits signals through the commlink 17A from or to the antenna module 10A. The commlink 17A feeds output signals to, and receives input signals from, a display processor 22 and associated memory, that is programmed to display application information. A display unit 23 receives input signals from the display processor and visually and/or audibly displays antenna location and observation time. Location can be displayed visually as longitude, latitude and elevation coordinates or in terms of coordinates referenced to local monuments such as state plane, or other reference systems such as Universal Transverse Mercator, Military Grid Reference System, Universal Polar Stereographic, Ordinance Survey of Great Britain and GPS Cartesian Coordinates.

Location can also be displayed or presented audibly, for example, by incorporating a simple speech synthesis module and loudspeaker in the display unit 23, which receives location and/or time information from the display processor 22 and presents this to the user as audibly perceptible information.

A power supply 24 provides operating power for the commlink 17A, the display processor 22 and/or the display unit 23. The power supplies 15 and/or 24 contained in the antenna module 10A and/or in the display module 20A may contain rechargeable or non-rechargeable batteries.

Alternatively, the DGPS radiowave receiver 19 for DGPS signals may be located on the display module 20' rather than on the antenna module 10', as shown in FIG. 2. If this option is chosen, the GPS receiver/processor 14 computes present location and/or observation time from the original pseudorange information and passes this location/time information to a GPS correction post-processor 25 on the display module 20', using a commlink 17. A DGPS signal antenna 18 and optional preamplifier 18' on the antenna module 10' receives DGPS input signals and directs these signals to the DGPS radiowave receiver 19 on the display module 20', using the commlink 17. The DGPS radiowave receiver 19 directs the DGPS input signals to the GPS correction post-processor 25.

The GPS correction post-processor 25 receives the uncorrected location/time information from the antenna module 10' and computes the corrected present location and/or observation time of the GPS antenna 11. The post-processor 25 then passes this corrected location/time information to the display processor 22 and/or to the associated memory unit 19'. The commlink 17 or 37 in any of FIGS. 2–5 may be one or more interconnect cables, as in FIG. 1A, or, may be a wireless link and transmitter/receiver (or transceiver/transceiver), as in FIG. 1B.

Alternatively, the DGPS signal receiver 19 and optional associated memory 19' shown on the display module 20' in FIG. 2 may be moved to the antenna module 10", as illustrated in FIG. 3.

Alternatively, the DGPS signal antenna 18 and preamplifier 18' and the associated DGPS radiowave receiver 19 may be located on a second antenna module 20''' rather than on a first antenna module 10''', as shown in FIG. 4. If this option is chosen, the GPS receiver/processor 14 processes the original pseudorange information and passes the computed location/time information to a GPS post-processor 25 on the second antenna module 20'''. The DGPS radiowave receiver 19 directs the DGPS input signals to the GPS correction post-processor 25. The GPS correction post-processor 25 computes the DGPS-corrected location and/or time and passes this corrected information to the display processor 22 and/or to the associated memory unit 19'. The DGPS radiowave receiver 19 may be separate from, or may be combined with, the GPS post-processor 25.

FIG. 5 illustrates another embodiment of the invention, which includes another version of a DGPS Smart Antenna device that includes a first antenna module 30 and a second antenna module 40. The first antenna module 30 contains a GPS signal antenna 31, whose antenna output signals are amplified by a preamplifier 32 (optional). The GPS antenna output signals are received by a frequency converter or translator 33, that converts the GPS primary signal frequency to a frequency suitable for transmission, preferably without changing the GPS signal modulation characteristics. The output signals of the frequency translator 33 are received by a cable or other commlink 37, which communicates these signals to the second antenna module 40. The first antenna module 30 also contains a power supply 35 to supply operating power for the GPS antenna 31, the preamplifier 32, the frequency translator 33 and/or the commlink 37.

The second antenna module 40 in FIG. 5 receives input signals from the first antenna module 30 through the commlink 37 at a frequency translator 42 (optional) that converts the received signals to a frequency suitable for signal processing. A DGPS signal antenna 43 and optional preamplifier 43' receive the DGPS radiowave signals and pass these signals to a DGPS radiowave DGPS receiver 44, with optional associated memory unit 44'. The DGPS receiver 44 passes the DGPS signals to a GPS/DGPS receiver/processor 45 that also receives the output signals from the frequency translator 42 (or from the commlink 37). The GPS/DGPS receiver/processor 45 computes pseudorange corrections for the original GPS signals and computes the corrected present location and/or observation time for the GPS antenna 31. The radiowave receiver 44 may be separate from, or may be combined with, the GPS/DGPS signal receiver/processor 45.

Corrected location and/or time output signals from the GPS/DGPS receiver/processor 45 are received by a display processor 46 and/or associated memory 46'. The display processor 46 is programmed to prepare the location and/or time information for visual and/or audible display. The output signals from the display processor 46 are received by a display unit 47 that displays the location and/or observation time. Location (and time) can be displayed visually as longitude, latitude and elevation coordinates or in terms of coordinates referenced to local monuments, as discussed in connection with the first embodiment in FIG. 1A. Location (and time) can also be displayed audibly, as discussed in connection with the first embodiment in FIG. 1A.

The second antenna module 40 also contains a power supply 48 to supply operating power for the commlink 37, the frequency translator 42, the DGPS radiowave signal antenna 43, the preamplifier 43', the radiowave receiver 44 and associated memory 44', the GPS/DGPS signal receiver/processor 45, the display processor 46, the associated memory unit 46' and/or the display unit 47. The power supplies 35 and 48 for the first and second antenna modules 30 and 40 may contain rechargeable or non-rechargeable batteries.

The second antenna module 20" (FIG. 4) or 40 (FIG. 5) may include a general purpose computer, programmed for general applications of GPS. Alternatively, the display unit 23 (FIG. 4) or 47 (FIG. 5) may be specifically designed for marine, aviation, or terrestrial applications for navigation, tracking, map making, surveying, event marking, or any other field in which GPS location is determined and applied.

FIG. 6 illustrates a handheld embodiment in which all components are contained on a single module 60. The original GPS pseudorange signals are received by a GPS antenna 61 and optional preamplifier 62 and passed through a frequency downconverter 63 to a GPS/DGPS signal receiver/processor 64. The DGPS correction signals are received by a DGPS antenna 65 and optional preamplifier 65' and passed through a DGPS radiowave receiver 66, with optional memory unit 67' to the GPS/DGPS signal receiver/processor 64. The GPS/DGPS receiver/processor 64 computes DGPS-corrected pseudoranges and computes and issues GPS/DGPS-determined present location and/or observation time signals. These output signals are received by a display processor 68 that processes these signals and passes the processed signals to a display unit 69 for visible and/or audible display in a selected coordinate system. Power for one or more components on this handheld embodiment is provided by a power supply 70. The size of this embodiment may be 5–20 cm in horizontal diameter by 5–20 cm in height.

The two modules shown in each of FIGS. 1A, 1B and 2–6 can be modularized further so that more than two modules are used for a particular embodiment, with cable or wireless links being used to provide communication between the different modules.

FIG. 7 illustrates one embodiment 71 of a combination of the two antennas used in the invention. A radome 73 covers a portion of the DGPS Smart Antenna Card and defines a radome interior that includes a turnstyle GPS signal antenna 75 and a portion of a DGPS radiowave signal antenna 77. A portion of the DGPS radiowave signal antenna 77 optionally extends beyond the radome 73. The DGPS Smart Antenna Card assembly includes one or more printed circuit boards ("PCBs") 79 that are connected to the GPS antenna 75 and to the DGPS radiowave signal antenna 77 and that contain a power supply, preamplifier, frequency downconverter, GPS signal receiver/processor, DGPS signal receiver/processor, cable or transmitter or transceiver, display signal processor and visible or audible display unit for the corrected GPS location signals, as discussed in more detail above in connection with FIGS. 1A, 1B and 2–6. GPS signals received by the GPS signal antenna 75 are passed through a frequency downconverter and through a GPS signal receiver/processor, which are contained on one or more PCBs 79. The processed GPS signals are then stored in a memory unit associated with the receiver/processor and/or further processed by a display processor for display in any of a plurality of display formats on a display unit. The embodiment 71 optionally contains an electronic signal bidirectional connector 80 that can be used to download information to, or receive processed information from, the DGPS Smart Antenna Card.

FIG. 8 illustrates another embodiment 81 of a combination of the two antennas, including a radome 83, a GPS signal patch antenna 85, a whip DGPS radiowave signal antenna 87, one or more PCBs 89 for processing of the GPS and DSGPS signals received, and an electronic signal bidirectional connector 90.

Figure 9:
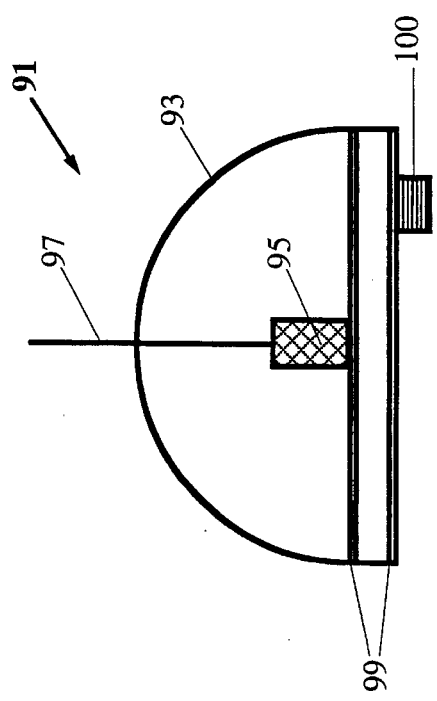

FIG. 9 illustrates another embodiment 91 of a combination of the two antennas, including a radome 93, a GPS signal quadrifilar antenna 95, a whip DGPS radiowave signal antenna 97, one or more PCBs 99 for processing of the GPS and DGPS radiowave signals received, and an electronic signal bidirectional connector 100.

FIG. 10 illustrates another embodiment 101 of a combination of the two antennas, including a radome 103, a GPS signal turnstyle antenna 105, a magnetic DGPS radiowave signal magnetic antenna 107, one or more PCBs 109 for processing of the GPS and DGPS signals received, and an electronic signal bidirectional connector 110.

Figure 11:
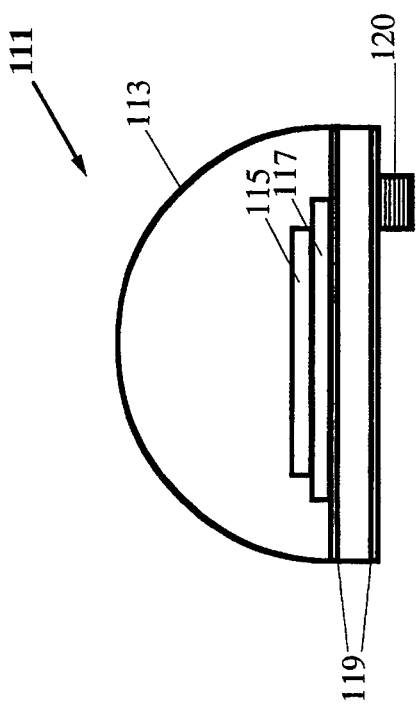

FIG. 11 illustrates another embodiment 111 of a combination of the two antennas, including a radome 113, a GPS signal patch antenna 115, a magnetic DGPS radiowave signal antenna 117, one or more PCBs 119 for processing of the GPS and DGPS radiowave signals received, and an electronic signal bidirectional connector 120.

Figure 12:
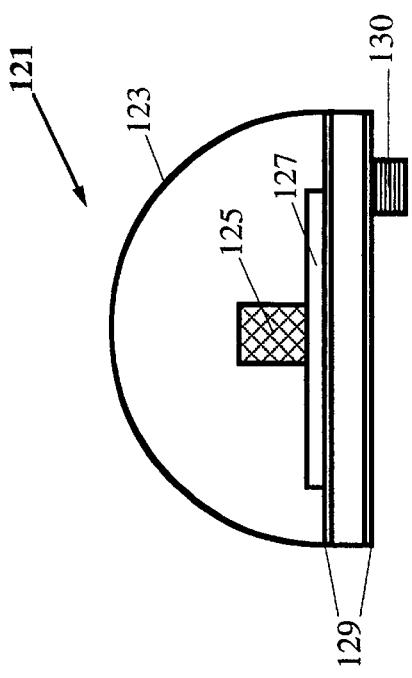

FIG. 12 illustrates another embodiment 121 of a combination of the two antennas, including a radome 123, a GPS signal turnstyle antenna 125, a magnetic DGPS radiowave signal antenna 127, one or more PCBs 128 for processing of the GPS and DGPS signals received, and an electronic signal bidirectional connector 129.

FIGS. 7–12 are representative of a larger number of embodiments that can be used to implement the signal processors illustrated schematically in FIGS. 1A, 1B and 2–6 and are not intended to limit the scope of the invention.

FIG. 13 illustrates operation of the system according to the invention. A GPS reference station 131, whose location is known with high accuracy, receives GPS signals at its GPS signal antenna 133 and its GPS signal receiver/processor 135 from a plurality of GPS satellites 137a, 137b, 137c, 137d, etc. and compares its GPS-determined location with the known location of the reference station. The reference station 131 then transmits DGPS pseudorange location correction signals that allow correction of the GPS-determined location of the reference station, using a DGPS correction signal transmitter 139 and associated antenna 141. A DGPS Smart Antenna Card 143, spaced apart from the GPS reference station 131, serves as a GPS mobile station and includes a GPS signal antenna 145, a GPS/DGPS signal receiver/processor 147 connected to the antenna 145, a DGPS radiowave signal antenna 149 connected to the GPS/DGPS signal receiver/processor 147, and a display module 151 (optional). The DGPS Smart Antenna Card 143 preferably has a size no greater than 5–20 cm in horizontal diameter by 5–20 cm in height and thus is highly portable. The GPS signal antenna 145 and associated GPS/DGPS receiver/processor 147 receive GPS signals from the GPS satellites 137a, 137b, 137c, 137d, etc. The GPS/DGPS signal receiver/processor 147 also receives DGPS correction signals through the DGPS radiowave signal antenna 149 from the reference station 131 and uses these correction signals to compute a corrected location for the GPS signal antenna 145. The display module 151 receives and visually and/or audibly displays the corrected location of the GPS antenna 145.

A Satellite Positioning System (SATPS) is a system of satellite-based signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two L-band carrier signals: an L1 signal having a frequency f1=1575.42 MHz and an L2 signal having a frequency f2=1227.6 MHz. These two frequencies are, integral multiples f1=1500 f0 and f2=1200 f0 of a base frequency f0=1.023 MHz. The L1 and L2 signals from each satellite are binary phase shift key (BPSK) modulated by predetermined pseudo random noise (PRN) codes that are different for each of the GPS satellites deployed. One motivation for use of two carrier signals L1 and L2 is to allow partial compensation for propagation delay of such a signal through the ionosphere, which delay varies approximately as the inverse square of signal frequency f (delay$\propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are stored in GPS satellite signal receivers carried by ground observers. A first PRN code for each GPS satellite, sometimes referred to as a precision code or P-code, is a relatively long, fine-grained code having an associated clock rate of 10 f0=10.23 MHz. A second PRN code for each GPS satellite, sometimes referred to as a coarse/acquisition code or C/A code, is intended to facilitate rapid satellite signal acquisition and is a relatively short, coarser/grained code having a clock rate of f0=1.023 MHz. The C/A code for any GPS satellite has a length of 1023 chips or time increments before this code repeats. The P-code for any GPS satellite has a length of precisely one week (7.000 days) before this code repeats. The GPS satellite bit stream includes information on the ephemeris of each GPS satellite, parameters identifying the particular GPS satellite, and corrections for ionospheric signal propagation delays. A useful discussion of the GPS and techniques for obtaining position information from the satellite signals is found in Tom Logsdon, *The Navstar Global Positioning System*, Van Nostrand Reinhold, 1992, pp. 17–90, incorporated by reference herein.

A second configuration for global positioning is the Global Orbiting Navigation Satellite System (GLONASS), placed in orbit by the former Soviet Union. GLONASS also uses 24 satellites, distributed approximately uniformly in three orbital planes of eight satellites each. Each orbital inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) MHz and f2=(1.246+7k/16) MHz, where k(=0, 1, 2, . . . , 23) is the channel or satellite number. Because the channel frequencies are distinguishable from each other, the P-code, and also the C/A code, is the same for each satellite.

Reference to a Global Positioning System or GPS herein refers to a Global Positioning System, to a Global Orbiting Navigation System, and to any other compatible satellite-based system that provides information by which an observer's position and/or the time of observation can be determined.

A Differential GPS Radiobeacon system was developed by the U.S. Coast Guard and Special Committee 104 of the Radio Technical Commission for Marine Services ("RTCM") to improve the accuracy of the Global Positioning System radiolocation signals that were made available to civilian users by Presidential Proclamation in 1983. At that time, the Department of Defense proposed that the Standard Positioning Service (SPS), implemented using GPS and offered to civilian users, would have a 2-sigma inaccuracy of 500 meters, later revised to 100M, where Selective Availability ("SA") is activated. Where SA is not activated, the corresponding inaccuracy would be 20–30M. The Precise Positioning Service (PPS), implemented using GPS and available only to Defense Department-authorized users, would have a 2-sigma inaccuracy of 17.8M. The Coast Guard and the RCTM have sought to provide radionavigation and location signals with an inaccuracy of no more than 8–20M 99.9 percent of the time (with SA absent), using differential corrections to GPS pseudorange signals that are broadcast from a fixed GPS station with a known, geodetically surveyed location. This 8–20M goal can usually be attained if the Horizontal Dilution of Precision ("HDOP") is less than 2.3. The HDOP is a dimensionless figure that depends upon the ratio of the volume of a polyhedron defined by the present satellite configuration, divided by the volume for a polyhedron defined by the optimum satellite configuration.

Corrected GPS signals with increased accuracy are needed for marine navigational users, for example, to allow navigation in narrow harbor channels, such as a 64-meter wide channel in the Swedish archipelago leading from the North Sea to Stockholm Harbor. The RTCM and Coast Guard have developed an acceptable system that is being continually improved, and the first working DGPS system was installed and operated by Magnavox for marine navigation between Sweden and Finland in 1991, using standards developed by the International Association of Lighthouse Authorities ("IALA"). Although the initial motivation for development of DGPS systems was for marine navigation, use of such systems is expected to expand to include navigation in all terrestrial environments.

As proposed for use in the United States, the DGPS system provides a reference station that transmits DGPS correction signals in a frequency band from 283.5–325 kHz, using digital signals with Minimum Shift Keying ("MSK"), a modification of Frequency Shift Keying in which the phase changes continuously, not discontinuously, when the frequency changes at 0–1 transition points. MSK signalling is described, but incorrectly illustrated, in W. Tomasi, *Electronic Communication Systems*, Prentice Hall, New Jersey, 1988, pp. 495–496. DGPS signals are preferably transmitted at time intervals of no longer than 10 seconds, and each message includes at least 5 data words of 30 bits each, including 6 bits for error check, with a two-word header for the usual protocol entries. The data rate for transmission of DGPS information is presently 50 or 100 bit/sec but may be changed. DGPS radiowave signals in the U.S. include a main carrier signal and a subcarrier signal, with 3 dB lower signal strength and offset above the main carrier signal by 1.024 kHz. The main carrier signal is modulated with the DGPS corrections, using forward error correction or some other error check scheme.

The DGPS radiowave signals may be transmitted as a Coast Guard RF subcarrier, as an FM subcarrier, as an AM subcarrier, as part of a proprietary subcarrier system, or as any other suitable subcarrier. The reference station may receive GPS signals directly from the GPS satellites, determine the GPS corrections and transmit these corrections to other stations in the system. Alternatively, the reference station may receive GPS corrections from another station or satellite in the system and transmit these corrections to other stations in the system.

Each message includes pseudorange corrections for three GPS satellites, as determined by a reference GPS receiving station of fixed, known location. A first method of GPS location correction involves computation and transmission of a location correction in Cartesian coordinates ($\Delta x, \Delta y, \Delta z$), which is then received and applied by a mobile GPS station. These location corrections can be expressed in an ECEF coordinate frame corrections, or as longitude, latitude and altitude corrections, or in any other suitable correction format. This method allows transmission of less data, but the inaccuracy, as applied to correction of the mobile station's location, grows quickly as the separation distance between the reference station and the mobile station increases.

For this reason, a second method of GPS location error correction is used in which pseudorange corrections are computed and transmitted by the reference station for each of the GPS satellites in view from that station. This requires transmission of more data, but the associated location errors for a mobile station do not grow as quickly with increasing separation distance. The DGPS approach adopts the second method for GPS location error correction. Location for a reference station is usually chosen to provide full-hemisphere visibility so that a maximum number of satellites (usually 8–12) are visible from the reference station. A mobile GPS station will often view fewer than this maximum number of satellites and will apply only the pseudorange corrections for the satellites the station is presently using for its GPS-determined location computations.

The DGPS system requires a-reference GPS station and associated DGPS correction signal transmitter, which may be, but need not be, located adjacent to each other. The DGPS system optionally provides an Integrity Monitor station, including a GPS receiver, an MSK correction signal receiver, and a computer, that continually checks on receipt of GPS signals, DGPS radiowave signals and the MSK broadcast signal for "health", geographical coverage and similar parameters. If the Integrity Monitor station senses that something is seriously wrong with the transmissions, this station will inform the reference station and the receiving mobile stations, and use of DGPS correction signals may terminated for some time. A mobile GPS station will include a GPS signal antenna and associated receiver/processor and a DGPS signal antenna connected to the receiver/processor to process the pseudorange corrections before the GPS location computations are performed.

A DGPS message may be any of 64 message types, most of which are not yet allocated by the RCTMS. A Type 1 message contains the basic DGPS pseudorange correction signals (PRC) in the form $$PRC(t)=PRC(t0)+(t-t0)RRC(t0)(t \geq t0), \quad (1)$$

where PRC(t0) is the most recently received pseudorange signal for a particular satellite at time t0 and RRC(t0) is one of a sequence of range correction signals received by the station at times between receipt of two consecutive pseudorange correction signals for a given GPS satellite. Pseudorange drift due to error can be 0.5M/sec, or more under some circumstances (e.g., when SA is activated). If the range corrections for a given GPS satellite have too large a magnitude, indicating that the pseudorange for that satellite is changing too quickly, a Type 9 message will be broadcast containing more frequently updated PRC or RRC information for that satellite. Type 9 messages might be transmitted if SA is presently activated for the GPS.

A Type 2 message is used to provide updated ephemeris information from the reference GPS station more frequently than may be required for most users. This type message provides changes in PRC and/or RRC for each satellite, referred to as "Delta DGPS corrections." These corrections are added, when received, to the DGPS corrections received in the Type 1 and Type 9 messages. A reference GPS station will broadcast Type 2 messages for a few minutes immediately following a change in satellite ephemeris. A Type 3 message, normally broadcast once every 5–15 minutes, provides the reference station location parameters, accurate to within 0.01M, and may include ionospheric and tropospheric propagation corrections.

A Type 5 message contains information on the satellite constellation health, indicating which, if any, satellite appears to be unhealthy for use in DGPS navigation. A Type 6 message is a null message and is used to maintain time synchronization if no other messages are to be transmitted at that time. A Type 7 message contains radiobeacon almanac information, including location, transmission frequency, service range and health for adjacent DGPS reference stations (which may be tens of kilometers apart).

A Type 16 message is an ASCII message, up to 90 characters long, used to broadcast warning information, such as scheduled outage of a particular GPS reference station. The Type 16 message is supplemented by a Type 22 message, which provides information on the integrity for the present transmissions and for future transmissions. Use of message Types 5, 7 and 22 is considered tentative at this time.

Each beacon in a network of GPS reference stations can broadcast at a slightly different frequency, for example, spaced apart by 500–1000 Hz., to allow a mobile GPS station to identify the reference station presently used by the mobile station. A mobile station can switch from one reference station to another, by tuning, if the signal reception from the first station is degraded. A DGPS radiowave signal may be received and used by a mobile GPS station located as much as 300 nautical miles from the reference GPS station.

DGPS radiowave signals can remove most of the effects of SA, satellite clock drift, satellite ephemeris errors, and atmospheric interference caused by GPS signal propagation through the ionosphere and/or troposphere. A DGPS cannot remove receiver clock errors (usually removed by use of difference signals) or multipath signal errors, which are local and peculiar to a given mobile station.

I claim:

1. Apparatus for determination of the location of an observer or the time of observation by use of a Global Positioning System (GPS), the apparatus comprising:

an antenna module comprising:

a GPS signal antenna positioned to receive GPS signals from one or more GPS satellites, where each satellite issues a distinct GPS signal, and to issue a GPS antenna output signal;

a frequency downconverter to receive the GPS antenna output signal and to issue this signal as an output signal at a selected lower frequency;

a Differential Global Positioning System (DGPS) radiowave signal antenna and receiver positioned to receive DGPS radiowave signals, to provide GPS information for correction of the GPS antenna location from a DGPS radiowave signal source, and to issue a DGPS antenna output signal;

a GPS/DGPS signal processor to receive the downconverter output signal and the DGPS antenna output signal, to process these signals to determine at least one of (i) the present location of the GPS antenna, as corrected by the DGPS signals, and (ii) the present time of observation of a satellite by the GPS antenna, and to issue information on this present location or this present time of observation as an output signal;

a commlink to receive the output signal from the GPS/DGPS signal processor, to communicate this signal to a selected signal receiver; and a first power supply, positioned to supply operating power to at least one of the GPS antenna, the downconverter, the GPS/DGPS signal processor, the DGPS antenna and the commlink; and a display module, spaced apart from the antenna module and comprising:

a display processor to receive the commlink signal, to process this signal for display of information contained in the signal received, and to issue the processed signal as an output signal;

display means for receiving the display processor output signal and for visually or audibly displaying at least one of (i) the present location of the GPS antenna and the (ii) present time of observation by the GPS antenna; and a second power supply, positioned to supply operating power to at least one of the commlink, the display processor and the display means, where at least one of the antenna module and the display module is capable of being held in the hand.

2. The apparatus of claim 1, wherein said commlink operates with a carrier signal frequency in at least a portion of a frequency range drawn from the class consisting of audible frequencies, acoustic frequencies, radio frequencies, infrared frequencies and visible frequencies.

3. The apparatus of claim 1, wherein said display a map of a local region and displays said present location of said GPS antenna on said map.

4. The apparatus of claim 1, wherein said display includes an instrument for adding, modifying or deleting attributes on said map.

5. The apparatus of claim 1, wherein said display means displays the coordinates of said present location of said GPS antenna.

6. The apparatus of claim 1, wherein said commlink comprises at least one cable that connects said antenna module to said display module.

7. The apparatus of claim 1, wherein said commlink comprises a transmitter located on said antenna module, a receiver located on said display module, and a wireless link that facilitates propagation of signals from the transmitter to the receiver.

8. The apparatus of claim 1, wherein said commlink comprises a transmitter located on said antenna module, a receiver located on said display module, and a signal-carrying cable that facilitates propagation of signals from the transmitter to the receiver.

9. The apparatus of claim 1, wherein said GPS antenna is drawn from a class of antennas consisting of a patch antenna, a turnstyle antenna and a quadrifilar antenna.

10. The apparatus of claim 1, wherein at least one of said antenna module and display module has a diameter, measured in any plane parallel to a selected plane, no larger than 20 cm and that has a height, measured in a direction approximately perpendicular to the selected plane, no larger than 20 cm.

11. Apparatus for determination of the location of an observer or the time of observation by use of a Global Positioning System (GPS), the apparatus comprising:

an antenna module comprising:
a GPS signal antenna positioned to receive GPS signals from one or more GPS satellites, where each satellite issues a distinct GPS signal, and to issue a GPS antenna output signal;
a frequency downconverter to receive the GPS antenna output signal and to issue this signal as an output signal at a selected lower frequency;
a Differential Global Positioning System (DGPS) radiowave signal antenna positioned to receive DGPS radiowave signals, which provide GPS information for correction of the GPS antenna location from a DGPS radiowave signal source, and to issue a DGPS antenna output signal;
a GPS signal processor to receive the downconverter output signals, to process these signals to determine at least one of (i) the present location of the GPS antenna, and (ii) the present time of observation of a satellite by the GPS antenna, and to issue information on this present location or this present time of observation as an output signal;
a commlink to receive the GPS signal processor output signal and the DGPS antenna output signal and to communicate these signals to a selected signal processor and a selected signal receiver, respectively; and a first power supply, positioned to supply operating power to at least one of the GPS antenna, the downconverter, the GPS signal processor, the DGPS antenna and the commlink; and a display module, spaced apart from the antenna module and comprising:
a DGPS signal receiver to receive the DGPS antenna output signal from the commlink and to issue a DGPS receiver output signal;
a GPS post-processor to receive the GPS processor output signal from the commlink, to receive the DGPS receiver output signal, to determine at least one of (1) the present location of the GPS antenna and (ii) the time of observation of a GPS satellite, as corrected by the DGPS antenna output signal, and to issue this corrected information as an output signal;
a display processor to receive the GPS post-processor output signal, to process this signal for display of information contained in the signal received, and to issue the processed signal as an output signal;
display means for receiving the display processor output signal and for visually or audibly displaying at least one of (i) the present location of the GPS antenna and the (ii) present time of observation by the GPS antenna; and
a second power supply, positioned to supply operating power to sat least one of the commlink, the DGPS signal receiver, the GPS post-processor, the display processor and the display means, where at least one of the antenna module and the display module is capable of being held in the hand.

12. The apparatus of claim 11, wherein said commlink operates with a carrier signal frequency in at least a portion of a frequency range drawn from the class consisting of audible frequencies, acoustic frequencies, radio frequencies, infrared frequencies and visible frequencies.

13. The apparatus of claim 11, wherein said display a map of a local region and displays said present location of said GPS antenna on said map.

14. The apparatus of claim 11, wherein said display includes an instrument for adding, modifying or deleting attributes on said map.

15. The apparatus of claim 11, wherein said display means displays the coordinates of said present location of said GPS antenna.

16. The apparatus of claim 11, wherein said commlink comprises at least one cable that connects said antenna module to said display module.

17. The apparatus of claim 11, wherein said commlink comprises a transmitter located on said antenna module, a receiver located on said display module, and a wireless link that facilitates propagation of signals from the transmitter to the receiver.

18. The apparatus of claim 11, wherein said commlink comprises a transmitter located on said antenna module, a receiver located on said display module, and a signal-carrying cable that facilitates propagation of signals from the transmitter to the receiver.

19. The apparatus of claim 11, wherein said GPS antenna is drawn from a class of antennas consisting of a patch antenna, a turnstyle antenna and a quadrifilar antenna.

20. The apparatus of claim 11, wherein at least one of said antenna module and display module has a diameter, measured in any plane parallel to a selected plane, no larger than 20 cm and that has a height, measured in a direction approximately perpendicular to the selected plane, no larger than 20 cm.

21. Apparatus for determination of the location of an observer or the time of observation by use of a Global Positioning System (GPS), the apparatus comprising:

an antenna module comprising:
- a GPS signal antenna positioned to receive GPS signals from one or more GPS satellites, where each satellite issues a distinct GPS signal, and to issue a GPS antenna output signal;
- a frequency downconverter to receive the GPS antenna output signal and to issue this signal as an output signal at a selected lower frequency;
- a Differential Global Positioning System (DGPS) radiowave signal antenna and receiver positioned to receive DGPS radiowave signals, which provide information for correction of the GPS antenna location, from a DGPS radiowave signal source and to issue a DGPS antenna output signal;
- a GPS signal processor to receive the downconverter output signals, to process these signals to determine at least one of (i) the present location of the GPS antenna and (ii) the time of observation of a satellite by the GPS antenna, and to issue information on this present location or this present time of observation as an output signal;
- a commlink to receive the GPS signal processor output signal and the DGPS antenna output signal and to communicate these signals to a selected signal processor; and
- a first power supply, positioned to supply operating power to at least one of the GPS antenna, the downconverter, the GPS signal processor, the DGPS antenna and receiver and the commlink; and a display module, spaced apart from the antenna module and comprising:
- a GPS post-processor to receive the DGPS antenna output signal and the GPS processor output signal, to determine at least one of (i) the present location of the GPS antenna and (ii) the time of observation of a GPS satellite, as corrected by the DGPS antenna output signal, and to issue this corrected information as an output signal;
- a display processor to receive the GPS post-processor output signal, to process this signal for display of information contained in the signal received, and to issue the processed signal as an output signal;
- display means for receiving the display processor output signal and for visually or audibly displaying at least one of (i) the present location of the GPS antenna and (ii) the present time of observation by the GPS antenna; and
- a second power supply, positioned to supply operating power to at least one of the commlink, the GPS post-correction processor, the display processor and the display means, where at least one of the antenna module and the display module is capable of being held in the hand.

22. The apparatus of claim 21, wherein said commlink operates with a carrier signal frequency in at least a portion of a frequency range drawn from the class consisting of audible frequencies, acoustic frequencies, radio frequencies, infrared frequencies and visible frequencies.

23. The apparatus of claim 21, wherein said display a map of a local region and displays said present location of said GPS antenna on said map.

24. The apparatus of claim 21, wherein said display includes an instrument for adding, modifying or deleting attributes on said map.

25. The apparatus of claim 21, wherein said display means displays the coordinates of said present location of said GPS antenna.

26. The apparatus of claim 21, wherein said commlink comprises at least one cable that connects said antenna module to said display module.

27. The apparatus of claim 21, wherein said commlink comprises a transmitter located on said antenna module, a receiver located on said display module, and a wireless link that facilitates propagation of signals from the transmitter to the receiver.

28. The apparatus of claim 21, wherein said commlink comprises a transmitter located on said antenna module, a receiver located on said display module, and a signal-carrying cable that facilitates propagation of signals from the transmitter to the receiver.

29. The apparatus of claim 21, wherein said GPS antenna is drawn from a class of antennas consisting of a patch antenna, a turnstyle antenna and a quadrifilar antenna.

30. The apparatus of claim 21, wherein at least one of said antenna module and display module has a diameter, measured in any plane parallel to a selected plane, no larger than 20 cm and that has a height, measured in a direction approximately perpendicular to the selected plane, no larger than 20 cm.

31. Apparatus or determination of the location of an observer or the time of observation by use of a Global Positioning System (GPS), the apparatus comprising:

a first antenna module comprising:
- a GPS signal antenna positioned to receive GPS signals from one or more GPS satellites, where each satellite issues a distinct GPS signal, and to issue a GPS antenna output signal;
- a frequency downconverter to receive the GPS antenna output signal and to issue this signal as an output signal at a selected lower frequency;
- a GPS signal processor to receive the downconverter output signed, to process this signal to determine at least one of (i) the present location of the GPS antenna and (ii) the present time of observation of a satellite by the GPS antenna, and to issue information on this present location or this present time of observation as an output signal;
- a commlink to receive the GPS signal processor output signal and to communicate this signal to a selected signal receiver; and
- a first power supply, positioned to supply operating power to at least one of the GPS signal antenna, the downconverter, the GPS signal processor and the commlink; and a second antenna module, spaced apart from the first antenna module and comprising:
- a Differential Global Positioning System (DGPS) radiowave signal antenna and receiver positioned to receive DGPS radiowave signals, to provide information for correction of the location of the GPS antenna, from a DGPS radiowave signal source and to issue a DGPS antenna output signal;
- a GPS correction post-processor to receive the DGPS antenna output signal and the GPS processor output signal, to determine at least one of (i) the present location of the GPS antenna and (ii) the time of observation of a GPS satellite, as corrected by the DGPS antenna output signal, and to issue this corrected information as an output signal;
- a display processor to receive the GPS post-processor output signal, to process this signal for display of information contained in the signal received, and to issue the processed signal as an output signal;

display means for receiving the display processor output signal and for visually or audibly displaying at least one of (i) the present location of the GPS antenna and (ii) the present time of observation by the GPS antenna; and a second power supply, positioned to supply operating power to at least one of the commlink, the DGPS radiowave signal antenna and receiver, the GPS post-correction processor, the display processor and the display means, where at least one of the first antenna module and the second antenna module is capable of being held in the hand.

32. The apparatus of claim 31, wherein said commlink operates with a carrier signal frequency in at least a portion of a frequency range drawn from the class consisting of audible frequencies, acoustic frequencies, radio frequencies, infrared frequencies and visible frequencies.

33. The apparatus of claim 31, wherein said display a map of a local region and displays said present location of said GPS antenna on said map.

34. The apparatus of claim 31, wherein said display includes an instrument for adding, modifying or deleting attributes on said map.

35. The apparatus of claim 31, wherein said display means displays the coordinates of said present location of said GPS antenna.

36. The apparatus of claim 31, wherein said commlink comprises at least one cable that connects said first antenna module to said second antenna module.

37. The apparatus of claim 31, wherein said commlink comprises a transmitter located on said first antenna module, a receiver located on said second antenna module, and a wireless link that facilitates propagation of signals from the transmitter to the receiver.

38. The apparatus of claim 31, wherein said commlink comprises a transmitter located on said first antenna module, a receiver located on said second antenna module, and a signal-carrying cable that facilitates propagation of signals from the transmitter to the receiver.

39. The apparatus of claim 31, wherein said GPS antenna is drawn from a class of antennas consisting of a patch antenna, a turnstyle antenna and a quadrifilar antenna.

40. The apparatus of claim 31, wherein at least one of said first antenna module and second antenna module has a diameter, measured in any plane parallel to a selected plane, no larger than 20 cm and that has a height, measured in a direction approximately perpendicular to the selected plane, no larger than 20 cm.

41. Apparatus for determination of the location of an observer or the time of observation by use of a Global Positioning System (GPS), the apparatus comprising:

a first antenna module comprising:

a GPS antenna positioned to receive GPS signals from one or more GPS satellites, where each satellite issues a distinct GPS signal, and to issue an antenna output signal;

a first frequency converter to receive the antenna output signal and to issue this signal as an output signal at a first selected frequency;

a commlink to receive the output signal from the first frequency translator and to communicate this signal to a selected signal receiver; and a first power supply, positioned to supply operating power to at least one of the GPS antenna, the first frequency converter and the commlink; and a second antenna module, spaced apart from the first antenna module and comprising:

a second frequency converter to receive the commlink signal and to issue this signal as an output signal at a second selected frequency;

a Differential Global Positioning System (DGPS) radiowave signal antenna and receiver positioned to receive DGPS radiowave signals, to provide information for correction of the location of the GPS antenna, from a DGPS; radiowave signal source and to issue a DGPS antenna output signal;

a GPS/DGPS signal processor to receive the second frequency converter output signal and the DGPS antenna output signal, to process these signals to determine at least one of (i) the present location of the GPS antenna and (ii) the time of observation of a GPS satellite by the GPS antenna, as corrected by the DGPS signals, and to issue information on the present location of the GPS antenna or the present time of observation as an output signal;

a display processor to receive the GPS/DGPS signal processor output signal, to process this signal for display of information contained in the signal received, and to issue the processed signal as an output signal;

display means for receiving the display processor output signal and for visually or audibly displaying at least one of (i) the present location of the GPS antenna and (ii) the time of observation of a GPS satellite; and a second power supply, positioned to supply operating power to at least one of the commlink, the second frequency converter, the DGPS antenna and receiver, the GPS/DGPS signal processor, the display processor and the display means, where at least one of the first antenna module and the second antenna module is capable of being held in the hand.

42. The apparatus of claim 41, wherein said commlink operates with a carrier signal frequency in at least a portion of a frequency range drawn from the class consisting of audible frequencies, acoustic frequencies, radio frequencies, infrared frequencies and visible frequencies.

43. The apparatus of claim 41, wherein said display a map of a local region and displays said present location of said GPS antenna on said map.

44. The apparatus of claim 41, wherein said display includes an instrument for adding, modifying or deleting attributes on said map.

45. The apparatus of claim 41, wherein said display means displays the coordinates of said present location of said GPS antenna.

46. The apparatus of claim 41, wherein said commlink comprises at least one cable that connects said first antenna module to said second antenna module.

47. The apparatus of claim 41, wherein said commlink comprises a transmitter located on said first antenna module, a receiver located on said second antenna module, and a wireless link that facilitates propagation of signals from the transmitter to the receiver.

48. The apparatus of claim 41, wherein said commlink comprises a transmitter located on said first antenna module, a receiver located on said second antenna module, and a signal-carrying cable that facilitates propagation of signals from the transmitter to the receiver.

49. The apparatus of claim 41, wherein said GPS antenna is drawn from a class of antennas consisting of a patch antenna, a turnstyle antenna and a quadrifilar antenna.

50. The apparatus of claim 41, wherein at least one of said first antenna module and second antenna module has a diameter, measured in any plane parallel to a selected plane, no larger than 20 cm and that has a height, measured in a direction approximately perpendicular to the selected plane, no larger than 20 cm.

51. Apparatus for determination of the location of an observer or the time of observation by use of a Global Positioning System (GPS), the apparatus comprising:

a GPS signal antenna positioned to receive GPS signals from one or more GPS satellites, where each satellite issues a distinct GPS signal, and to issue a GPS antenna output signal;

a frequency downconverter to receive the GPS antenna output signal and to issue this signal as an output signal at a selected lower frequency;

a Differential Global Positioning System (DGPS) radiowave signal antenna and receiver positioned to receive DGPS radiowave signals, which provide GPS information for correction of the GPS antenna location from a DGPS radiowave signal source, and to issue a DGPS output signal;

a GPS/DGPS signal processor to receive the downconverter output signal and the DGPS output signal, to process these signals to determine at least one of (i) the present location of the GPS antenna and (ii) the present time of observation of a satellite by the GPS antenna, as corrected by the DGPS output signal and to issue this information as an output signal;

a display processor to receive the GPS/DGPS signal processor output signal, to process this signal for display of information contained in the signal received, and to issue the processed signal as an output signal;

display means for receiving the display processor output signal and for visually or audibly displaying at least one of (i) the present location of the GPS antenna and the (ii) present time of observation by the GPS antenna; and a power supply, positioned to supply operating power to at least one of the GPS antenna, the downconverter, the DGPS antenna and receiver, the GPS/DGPS signal processor, the display processor and the display means, where the apparatus is capable of being held in the hand.

52. The apparatus of claim 51, wherein said commlink operates with a carrier signal frequency in at least a portion of a frequency range drawn from the class consisting of audible frequencies, acoustic frequencies, radio frequencies, infrared frequencies and visible frequencies.

53. The apparatus of claim 51, wherein said display a map of a local region and displays said present location of said GPS antenna on said map.

54. The apparatus of claim 51, wherein said display includes an instrument for adding, modifying or deleting attributes on said map.

55. The apparatus of claim 51, wherein said display means displays the coordinates of said present location of said GPS antenna.

56. The apparatus of claim 51, wherein said commlink comprises at least one cable that connects said antenna module to said display module.

57. The apparatus of claim 51, wherein said commlink comprises a transmitter located on said antenna module, a receiver located on said display module, and a wireless link that facilitates propagation of signals from the transmitter to the receiver.

58. The apparatus of claim 51, wherein said commlink comprises a transmitter located on said antenna module, a receiver located on said display module, and a signal-carrying cable that facilitates propagation of signals from the transmitter to the receiver.

59. The apparatus of claim 51, wherein said GPS antenna is drawn from a class of antennas consisting of a patch antenna, a turnstyle antenna and a quadrifilar antenna.

60. The apparatus of claim 51, wherein at least one of said antenna module and display module has a diameter, measured in any plane parallel to a selected plane, no larger than 20 cm and that has a height, measured in a direction approximately perpendicular to the selected plane, no larger than 20 cm.

61. Apparatus for determination of the location of an observer or the time of observation by use of a Global Positioning System (GPS), the apparatus comprising:

a GPS reference station, whose location is known with high accuracy, to receive GPS signals, to compute the GPS-determined location of the reference station, to compare this location with the known location of the reference station, and to transmit GPS correction signals containing information that allows correction of a computed location of another GPS station, based upon the corrections required to reconcile the GPS-determined location of the reference station with the known location of the reference station; and an antenna module, whose dimensions are not greater than 20 cm in diameter by 20 cm in height and that is spaced apart from the reference station, which comprises:

a GPS signal antenna positioned to receive GPS signals from one or more GPS satellites, where each satellite issues a distinct GPS signal, and to issue a GPS antenna output signal;

a Differential Global Positioning System (DGPS) signal antenna and receiver positioned to receive GPS correction signals, which provide GPS information for correction of the location of the GPS antenna on the Card, and to issue a DGPS antenna output signal;

a GPS/DGPS signal processor to receive the GPS output signal and the DGPS antenna output signal, and to process these signals to determine at least one of (i) the present location of the GPS antenna, as corrected by the GPS correction signals, and (ii) the present time of observation of a satellite by the GPS antenna, and to issue information on this present location or this present time of observation as an output signal;

display means for receiving and processing the GPS signal processor output signal and for displaying at least one of (i) the present location of the GPS antenna and (ii) the present time of observation by the GPS antenna; and a power supply to supply power to at least one of the GPS signal antenna, the DGPS signal antenna and receiver, the GPS/DGPS signal processor, and the display means, where the antenna module is capable of being held in the hand.

* * * * *